United States Patent
Bydlon et al.

(10) Patent No.: US 12,551,291 B2
(45) Date of Patent: Feb. 17, 2026

(54) DWELLING TREATMENT MONITORING FOR ENDOLUMINAL THERAPY PROCEDURES

(71) Applicant: KONINKLIJKE PHILIPS N.V., Eindhoven (NL)

(72) Inventors: Torre Michelle Bydlon, Melrose, MA (US); Alvin Chen, Cambridge, MA (US); Molly Lara Flexman, Melrose, MA (US); James David Cezo, Colorado Springs, CO (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 611 days.

(21) Appl. No.: 17/910,821

(22) PCT Filed: Mar. 11, 2021

(86) PCT No.: PCT/EP2021/056124
§ 371 (c)(1),
(2) Date: Sep. 11, 2022

(87) PCT Pub. No.: WO2021/180826
PCT Pub. Date: Sep. 16, 2021

(65) Prior Publication Data
US 2023/0114323 A1    Apr. 13, 2023

Related U.S. Application Data

(60) Provisional application No. 62/988,459, filed on Mar. 12, 2020.

(51) Int. Cl.
*A61B 34/20*    (2016.01)
*A61B 17/3207*  (2006.01)
(Continued)

(52) U.S. Cl.
CPC .......... *A61B 34/20* (2016.02); *A61B 17/3207* (2013.01); *A61B 18/245* (2013.01);
(Continued)

(58) Field of Classification Search
CPC ... A61B 34/20; A61B 17/3207; A61B 18/245; A61B 34/30; A61B 2034/2061;
(Continued)

(56) References Cited

U.S. PATENT DOCUMENTS

| 9,144,693 B2 | 9/2015 | Appleman |
| 2007/0016272 A1* | 1/2007 | Thompson ............. A61B 18/08 607/113 |

(Continued)

FOREIGN PATENT DOCUMENTS

| EP | 3461400 A1 | 3/2019 |
| EP | 3513839 A1 | 7/2019 |

(Continued)

OTHER PUBLICATIONS

International Search Report and Written Opinion of PCT/EP2021/056124, dated May 26, 2021.

*Primary Examiner* — Sean D Mattson

(57) ABSTRACT

Various embodiments of the present disclosure encompass an endoluminal therapy system employing an endoluminal therapy device (21) and an endoluminal therapy monitoring controller (10). In support an endoluminal procedure, the endoluminal therapy device (21) is controlled to treat a site to be treated within a lumen. The controller (10) is operated to synchronize an activated dwell timing of the endoluminal therapy device (21) within the lumen to a tracked positioning of the endoluminal therapy device (21) contiguous with the site to be treated within the lumen. The controller (10) is further operated to monitor the site to be treated within the lumen induced by the endoluminal therapy device (21)

(Continued)

during the synchronization by the controller (10) of the activated dwell timing of the endoluminal therapy device (21) within the lumen to the tracked positioning of the endoluminal therapy device (21) contiguous with the site to be treated within the lumen.

19 Claims, 8 Drawing Sheets

(51) Int. Cl.
  *A61B 18/24* (2006.01)
  *A61B 34/30* (2016.01)
  *A61M 25/10* (2013.01)

(52) U.S. Cl.
  CPC ....... *A61B 2034/2061* (2016.02); *A61B 34/30* (2016.02); *A61M 25/104* (2013.01)

(58) Field of Classification Search
  CPC ...... A61B 2034/2051; A61B 2034/378; A61B 2090/3762; A61B 2090/376; A61B 90/37; A61B 2018/0022; A61B 2018/00345; A61M 25/104; Y02A 90/10; G16H 20/40; G16H 40/63
  See application file for complete search history.

(56) References Cited

U.S. PATENT DOCUMENTS

| | | | |
|---|---|---|---|
| 2007/0066888 A1* | 3/2007 | Maschke | A61B 8/12 600/424 |
| 2008/0300588 A1* | 12/2008 | Groth | A61B 18/1206 606/34 |
| 2011/0125150 A1 | 5/2011 | Deno | |
| 2013/0184697 A1* | 7/2013 | Han | A61B 90/37 606/32 |
| 2014/0206988 A1* | 7/2014 | Ramachandran | A61B 5/061 600/478 |
| 2014/0275996 A1 | 9/2014 | Stigall | |
| 2016/0113573 A1 | 4/2016 | Arai | |
| 2017/0312009 A1* | 11/2017 | Paul | A61B 18/1233 |
| 2018/0360342 A1 | 12/2018 | Fuimaono | |
| 2018/0360545 A1 | 12/2018 | Cole | |
| 2020/0046433 A1* | 2/2020 | Krimsky | A61B 34/20 |
| 2020/0402286 A1 | 12/2020 | Thienphrapa | |

FOREIGN PATENT DOCUMENTS

| | | |
|---|---|---|
| JP | 2018102921 A | 7/2018 |
| WO | 2011062971 A2 | 5/2011 |
| WO | 2012056386 A1 | 5/2012 |
| WO | 2016034598 A1 | 3/2016 |
| WO | 2017091869 A1 | 6/2017 |
| WO | 20018091746 A1 | 5/2018 |

* cited by examiner

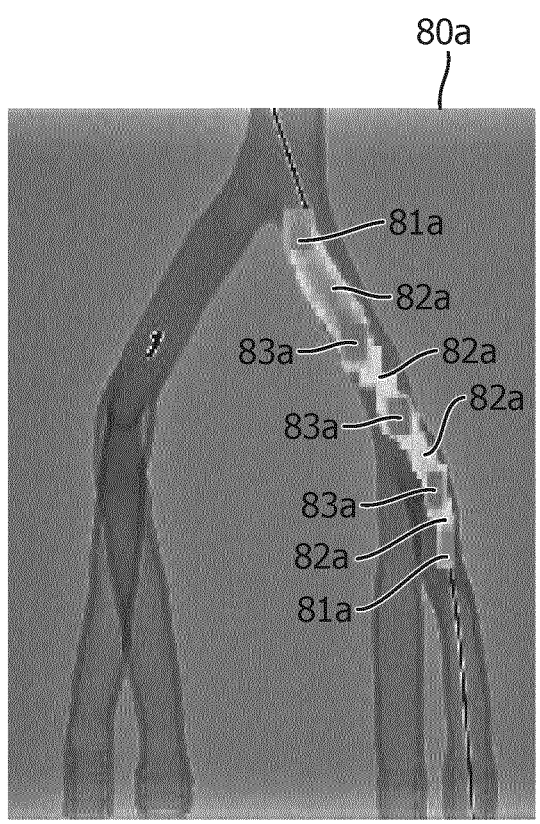
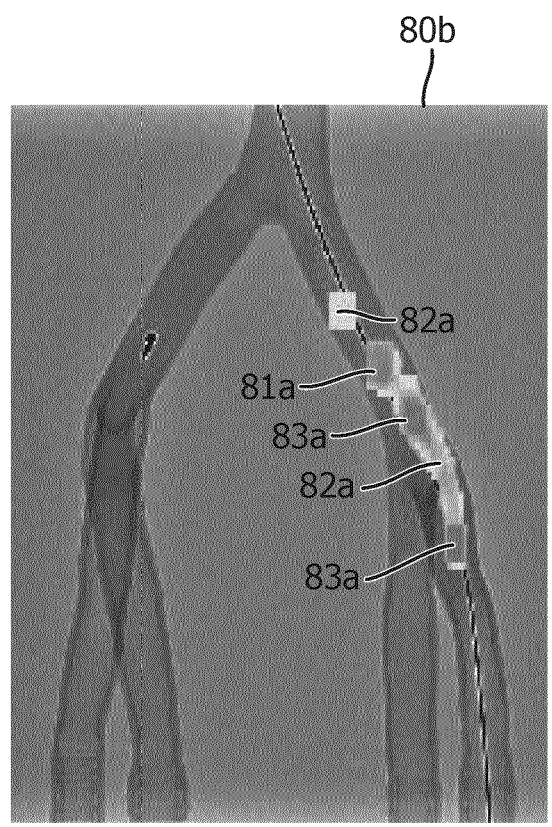
FIG. 2A  FIG. 2B
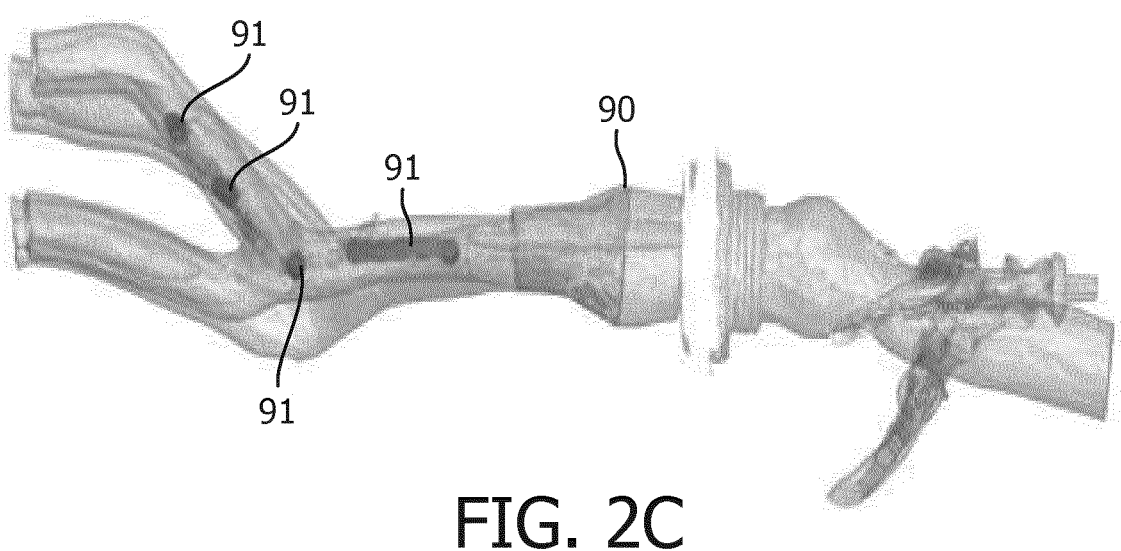
FIG. 2C

DWELLING TREATMENT MONITORING FOR ENDOLUMINAL THERAPY PROCEDURES

FIELD OF THE INVENTION

The present disclosure generally relates to endoluminal therapy procedures for treating a site of a lumen (e.g., atherectomy of an artery where a blockage occurs, an angioplasty of an artery or a vein, etc.). The present disclosure specifically relates to monitoring a dwell treatment within the lumen by an endoluminal therapy device (e.g., a laser atherectomy catheter, an orbital atherectomy catheter, a directional atherectomy catheter, a rotational atherectomy catheter, an angioplasty balloon catheter, an angioplasty stent catheter, etc.).

BACKGROUND OF THE INVENTION

Endoluminal therapy procedures comprise endovascular therapy procedures. And the majority of endovascular therapy procedures involve an opening up a vascular vessel that is blocked by a clot or by plaque as known in the art of the present disclosure. Several different types of endovascular therapy devices may be used to open the vascular vessel including, but not limited to (1) atherectomy catheters, which may be operated to drill or grind a hole through the blockage via a laser or a cutting mechanism, (2) balloon catheters, which may be inflated whereby the increasing pressure of the balloon causes the clot/the plaque to crack and hence open the vascular vessel, and (3) balloon expandable stents that may be used in conjunction with other therapies.

Typically during an endovascular therapy procedure, a catheter is run over a guidewire to a position contiguous with the clot or the plaque whereby the physician may activate a control mechanism on the endovascular therapy device. For example, in laser atherectomy, the catheter is attached to an activation controller via a pedal and the physician steps on the pedal to turn on the laser to begin drilling through the clot or the plaque. To unblock the vascular vessel, the laser is continually or intermittently activated and the catheter is pushed through a hole in the blockage created by the laser.

More particularly, to optimally treat the vascular vessel blockage, the endovascular therapy device (laser, cutting, balloon) must be continuously or intermittently activated through the clot/the plaque. To do this, the catheter must be continuously or intermittently advanced at certain speeds/distances and the laser activated for certain amounts of time. Each device comes with a set of specifications about the speed and activation time or balloon inflation pressure as a means of guiding the physician to fully treat the blockage of the vascular vessel.

It is also important to understand which parts of the vascular vessel have been treated as that may determine where subsequent therapy is applied. For example, it may be beneficial to know all locations where ballooning was applied to a vascular vessel so that those same locations can then be covered with a stent.

However, during a endovascular therapy procedure, it is very difficult for the physician to follow recommended speeds and activation times of the endovascular therapy device and therefore portions of the vascular vessel may be over-treated or under-treated.

This difficulty arises from having highly tortuous vascular vessels that may only be visualized with two-dimensional images (e.g., x-ray images). Attempting to navigate the endovascular therapy device through a bend that a physician is unable to see may mean that a portion of the vascular vessel may be under-treated because the endovascular therapy device is quickly passed through the bend in the vascular vessel.

This difficulty further arises from the physician having to create a mental map of where and for how long the endovascular therapy device was activated, and not having real-time assessment of the blockage treatment. As such, a contrast run may be required to do a post-operative assessment of how well the vascular vessel was treated. This requires the catheter to be removed and replaced with other devices, contrast usage, and radiation exposure.

SUMMARY OF THE INVENTION

It is an object of the present disclosure to provide a novel, unique dwell treatment monitoring during endoluminal (e.g. endovascular therapy procedures for treating a lumen (e.g. a blockage of a vascular vessel (e.g., atherectomy of an artery, an angioplasty of an artery or a vein, etc.)). Specifically, the present disclosure recognizes that an optimal treatment of such a treatment requires the endoluminal therapy device must be activated for a certain amount of time at certain positions. If a dwell time of the therapy device is too long in a given position, then there might be over-treatment resulting in possible damage to the lumen. If a dwell time of the therapy device is too short in a given position, then there may be under-treatment resulting in the lumen still experiencing unhealthy blood flow therein. The dwell treatment monitoring during endoluminal therapy procedures in accordance with the present disclosure provides controllers, systems and methods for monitoring an activated dwell timing of a therapy system device within a lumen with respect to a tracked positioning of the therapy device contiguous with site to be treated (e.g. the blockage within a vascular vessel) for purposes of therapy assessment and/or feedback of the treatment (e.g. of the blockage within the vascular vessel).

Exemplary embodiments of the present disclosure include, but are limited to, (1) an endoluminal (e.g. endovascular) therapy monitoring controller, (2) an endoluminal (e.g. endovascular) therapy system, and (3) an endoluminal (e.g. endovascular) therapy monitoring method.

Various endoluminal therapy monitoring controller embodiments of the present disclosure encompass an endoluminal therapy monitoring controller for monitoring a treatment (e.g. of a blockage) within a lumen (e.g. within a vascular vessel) induced by an endoluminal (e.g. endovascular) therapy device as known in the art of the present disclosure (e.g., a laser atherectomy catheter, an orbital atherectomy catheter, a directional atherectomy catheter, a rotational atherectomy catheter, an angioplasty balloon catheter, an angioplasty stent catheter, etc.).

In support of an endoluminal (e.g. an endovascular) therapy procedure (e.g., atherectomy of an artery, an angioplasty of an artery or a vein, etc.), the therapy monitoring controller of the present disclosure is configured (e.g., via programmed computer hardware and/or application specific integrated circuit) to synchronize an activated dwell timing of the therapy device within the lumen (e.g. within the vascular vessel) to a tracked positioning of the therapy device contiguous with the site to be treated within the lumen (e.g. a blockage within a vascular vessel), and to monitor the treatment (e.g. of the blockage) within the lumen (e.g. within the vascular vessel) induced by the therapy device during a synchronization by the therapy monitoring controller of the activated dwell timing of the therapy device within the lumen (e.g. within the vascular vessel) to the tracked positioning of the therapy device contiguous with the site to be treated (e.g. with the blockage within the vascular vessel).

Various endoluminal (e.g. endovascular) therapy system embodiments of the present disclosure encompass a therapy system employing an endoluminal (e.g. endovascular) therapy monitoring controller of the present disclosure and a therapy system device as known in the art of the present disclosure (e.g., a laser atherectomy catheter, an orbital atherectomy catheter, a directional atherectomy catheter, a rotational atherectomy catheter, an angioplasty balloon catheter, an angioplasty stent catheter, etc.). Various endoluminal therapy monitoring method embodiments of the present disclosure encompass a therapy system monitoring method involving an endoluminal therapy monitoring controller of the present disclosure synchronizing an activated dwell timing of the therapy device within the lumen to a tracked positioning of the therapy device contiguous with the site to be treated within the lumen.

The endoluminal (e.g. endovascular) therapy monitoring method further involves the endoluminal (e.g. endovascular) therapy monitoring controller of the present disclosure monitoring the treatment of the site to be treated (e.g. the blockage) within the lumen (e.g. within the vascular vessel) induced by the therapy device during a synchronization by the therapy monitoring controller of the activated dwell timing of the therapy device within the lumen to the tracked positioning of the endovascular therapy device contiguous with the site to be treated.

The foregoing embodiments and other embodiments of the present disclosure as well as various structures and advantages of the present disclosure will become further apparent from the following detailed description of various embodiments of the present disclosure read in conjunction with the accompanying drawings. The detailed description and drawings are merely illustrative of the present disclosure rather than limiting, the scope of the present disclosure being defined by the appended claims and equivalents thereof.

BRIEF DESCRIPTION OF THE DRAWINGS

The present disclosure will present in detail the following description of exemplary embodiments with reference to the following figures wherein:

FIGS. 2A-2C illustrate exemplary dwell time maps in accordance with the present disclosure;

DETAILED DESCRIPTION OF THE PREFERRED EMBODIMENTS

The present disclosure is applicable to endovascular therapy procedures for diagnosing and treating a vascular condition, typically through the use of guidewires and catheters to access vascular vessels (e.g., arteries and veins). Examples of vascular conditions related to a blockage of a vascular vessel include, but are not limited to, a carotid artery disease, a cardiovascular disease (e.g., atherosclerosis), a stroke deep vein thrombosis, pulmonary embolism and renal vascular disease. Now the present application can be applicable to other types of endoluminal therapy procedures.

Typically as known in the art of the present disclosure, subsequent to a diagnosis of a vascular condition, an endovascular therapy procedure involves an imaging and/or a tracking of an endovascular therapy device within the vascular vessel to facilitate the treatment of the vascular condition, such as, for example, a removal of a blockage within the vascular vessel (e.g., a clot or plaque).

The present disclosure improves upon the prior art of endovascular therapy procedures by providing unique embodiments of a dwell treatment monitoring for endovascular therapy procedures in accordance with the present disclosure by providing controllers, systems and methods for monitoring an activated dwell timing of an endovascular therapy devices within a vascular vessel with respect to a tracked positioning of the endovascular therapy device contiguous with the blockage within the vascular vessel for purposes of therapy assessment and/or feedback of a treatment of the blockage within the vascular vessel.

Figure 1:
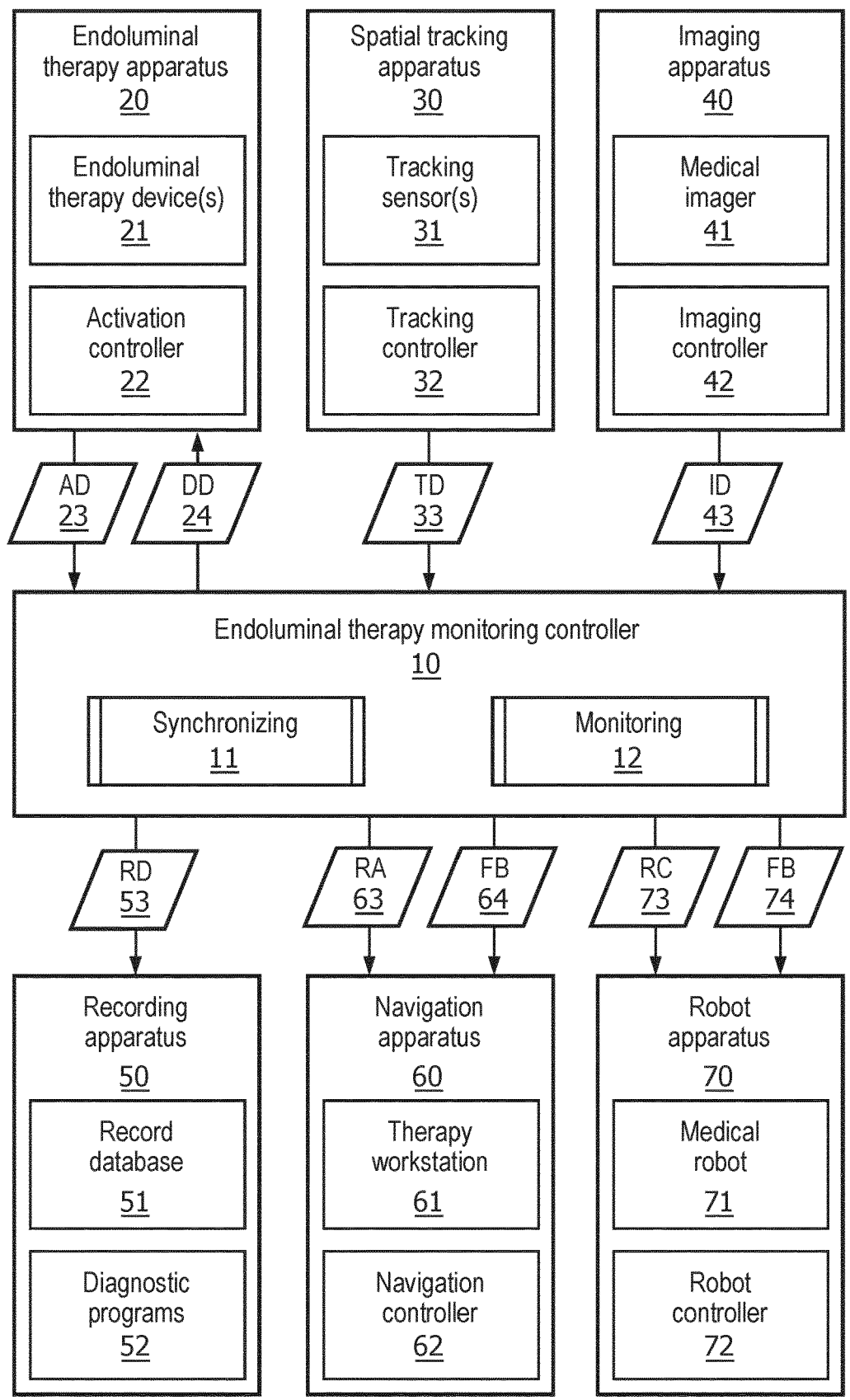
FIG. 1 illustrates an exemplary embodiment of an endovascular therapy system in accordance with the present disclosure.

To facilitate an understanding of the present disclosure, the following description of FIGS. 1 and 2 teaches exemplary embodiments of an endovascular therapy system in accordance with the present disclosure. From the description of FIGS. 1 and 2, those having ordinary skill in the art of the present disclosure will appreciate how to apply the present disclosure to make and use additional embodiments of an endovascular therapy system in accordance with the present disclosure.

Referring to FIG. 1, an exemplary endovascular therapy system of the present disclosure employs an endovascular therapy apparatus 20, a spatial tracking apparatus 30, an imaging apparatus 40, a recording apparatus 50, a navigation apparatus 60 and a robot apparatus 70.

For purposes of describing and claiming the present disclosure, the term "endovascular therapy apparatus" encompasses all apparatuses, as known in the art of the present disclosure and hereinafter conceived, including one or more endovascular therapy devices 21 for implementing a treatment of a blockage of a vascular vessel (e.g., a removal of a clot or a drilling/a cracking a hole through plaque). As noted above, endovascular is one example of endoluminal. Examples of an endoluminal therapy device 21 include, but are not limited to, a laser atherectomy catheter, an orbital atherectomy catheter, a directional atherectomy catheter, a rotational atherectomy catheter, an angioplasty balloon catheter and an angioplasty stent catheter.

In practice, endoluminal therapy apparatus 20 includes an activation controller 22 (e.g., programmed hardware and/or application specific integrated circuit) for controlling a manual or a robotic activation/deactivation of endoluminal therapy device(s) 21 as known in the art of the present disclosure.

Still referring to FIG. 1, for purposes of describing and claiming the present disclosure, the term "spatial tracking apparatus" encompasses all apparatuses, as known in the art of the present disclosure and hereinafter conceived, including one or more tracking sensor(s) 31 for implementing a localized spatial tracking of a device within a registered coordinate system. In practice, the tracking sensor(s) may further implement a localized temperature measurements, strain measurements and curvature measurements of an endoluminal therapy device 21 to thereby monitor an activated dwell timing of the endoluminal therapy device 21 as subsequently defined in the present disclosure.

In one exemplary embodiment, tracking sensor(s) 31 are optical shape sensor(s) (OSS) as known in the art the present disclose that utilize light along a multicore optical fiber for device localization and navigation during an endovascular therapy procedure. The principle involved makes use of distributed strain measurement in the optical fiber using characteristic Rayleigh backscatter or controlled grating patterns (e.g., Fiber Bragg Gratings). The shape along the optical fiber begins at a specific point along the optical shape sensor, known as the launch or z=0, and the subsequent shape position and orientation are relative to that point. In practice, the optical shape sensor(s) may integrated into an endoluminal therapy device 21 or another relevant device (e.g., a guidewire) in order to provide live guidance of the device during the endovascular therapy procedure without the need for radiation. The integrated fiber provides the position and orientation of the entire device. A non-limiting example of optical shape sensors include the FORS commercially offered by Philips Medical.

In practice of this embodiment spatial tracking apparatus 30 includes a OSS based tracking controller 32 (e.g., programmed hardware and/or application specific integrated circuit) for directing light through the optical fiber and for executing distributed strain measurements in the optical fiber as known in the art of the present disclosure.

For this embodiment, the OSS based tracking controller 32 may concurrently or alternatively execute temperature measurements of a portion of the optical fiber adjacent the endoluminal therapy device 21 as known in the art of the present disclosure to thereby monitor the activation of the endoluminal therapy device 21. Such temperature measurements facilitates optical shape sensor(s) systematically synchronizing an activated dwell timing of the endoluminal therapy device 21 within the vascular vessel to a tracked positioning of the endoluminal therapy device 21 contiguous with the blockage within the vascular vessel.

In a second exemplary embodiment, tracking sensor(s) 31 are electromagnetic (EM) sensors as known in the art of the present disclosure for detecting a magnetic field to facilitate a measurement of a position and/or an orientation of the EM sensor(s) within the magnetic field. A non-limiting example of a EM based spatial tracking apparatus is the AURORA electromagnetic tracking system commercially offered by NDI, Inc.

In practice of this embodiment, spatial tracking apparatus 30 includes a EM based tracking controller 32 (e.g., programmed hardware and/or application specific integrated circuit) for controlling a generation of the magnetic field and measuring a position and/or an orientation of the EM sensor(s) within the magnetic field as known in the art of the present disclosure.

Still referring to FIG. 1, for purposes of describing and claiming the present disclosure, the term "imaging apparatus" encompasses all apparatuses, as known in the art of the present disclosure and hereinafter conceived, including a medical imager 41 for directing energy (e.g., X-ray beams, ultrasound, radio waves, magnetic fields, light, electrons, lasers, and radionuclides) into an anatomy for purposes of generating images of the anatomy (e.g., a vascular system). Examples of medical imager 41 include, but are not limited to, an interventional X-ray generator/detector and an interventional ultrasound probe.

In practice, imaging apparatus 40 includes imaging controller 41 (e.g., programmed hardware and/or application specific integrated circuit) for controlling an activation/deactivation of medical imager 41 (e.g., an X-ray C-arm, an ultrasound probe, etc.) to systematically direct energy into an anatomy via operator-generated commands and/or image guided procedural-generated commands for the purposes of generating images of the anatomy as known in the art of the present disclosure.

Still referring to FIG. 1, for purposes of describing and claiming the present disclosure, the term "recording apparatus" encompasses all apparatuses, as known in the art of the present disclosure and hereinafter conceived, including a record database 51 for managing a storage of electronic medical records, electronic health records and/or patient health records. A non-limiting example of a recording apparatus 50 is the Tasy EMR commercially offered by Philips Medical.

In practice, recording apparatus 50 may include or have access to one or more diagnostic program(s) 52 for purposes of performing diagnostic analytics on one or more records as known in the art of the present disclosure.

Still referring to FIG. 1, for purposes of describing and claiming the present disclosure, the term "navigation apparatus" encompasses all apparatuses, as known in the art of the present disclosure and hereinafter conceived, including an endoluminal therapy workstation 61 for planning an endovascular therapy and navigating an endoluminal therapy device 21 within a patient in accordance with the plan. Examples of endoluminal therapy workstation 61 include, but are not limited to, image-guided workstations for endovascular therapy procedures (e.g., interoperative X-ray, interoperative ultrasound, etc.) and sensor-guided workstations for endovascular therapy procedures (e.g., interoperative optical shape sensing registered to pre-operative image(s), interoperative electromagnetic sensing registered to pre-operative image(s), etc.).

In practice, navigation apparatus 60 includes a navigation controller 62 (e.g., programmed hardware and/or application specific integrated circuit) for controlling the planning of an endovascular therapy and the navigating of an endoluminal therapy device 21 within a patient in accordance with the plan as known in the art of the present disclosure.

Still referring to FIG. 1, for purposes of describing and claiming the present disclosure, the term "robot apparatus" encompasses all apparatuses, as known in the art of the present disclosure and hereinafter conceived, including a medical robot 71 for guiding an endoluminal therapy device 21 or other device/tool for purposes in assisting in a precise performance of an endovascular therapy procedure.

In practice, robot apparatus 70 includes a robot controller 72 (e.g., programmed hardware and/or application specific integrated circuit) for controlling a movement of medical robot 71 in accordance with the plan as commanded by a physician via an input device (e.g., a telemanipulator) or by navigation controller 62.

Still referring to FIG. 1, in practice, apparatuses 20, 30, 40, 50, 60 and 70 represent exemplary endovascular therapy systems as known in the art of the present disclosure, such as, for example, image-guided systems commercially offered by Philips Healthcare for endovascular therapy procedures. The present disclosure improves upon endovascular therapy systems as known in the art of the present disclosure by providing an endovascular therapy monitoring controller 10 for monitoring an activated dwell timing of an endoluminal therapy device(s) 21 within a vascular vessel with respect to a tracked positioning of the endovascular therapy device contiguous with the blockage within the vascular vessel for purposes of therapy assessment and/or feedback of a treatment of a blockage within the vascular vessel.

In practice, endoluminal therapy monitoring controller 10 may be (1) installed within one of the apparatuses 20, 30, 40, 50, 60 and 70, (2) distributed among one or more of the apparatuses 20, 30, 40, 50, 60 and 70, or (3) installed within a separate device, such as, for example, a tablet, laptop or workstation.

For purposes of describing and claiming the present disclosure, the term "endovascular therapy monitoring controller" encompasses all structural configurations, as understood in the art of the present disclosure and as exemplary described in the present disclosure, of a main circuit board or an integrated circuit for controlling an application of various principles of the present disclosure for monitoring an activated dwell timing of an endovascular therapy devices within a vascular vessel with respect to a tracked positioning of the endovascular therapy device contiguous with the blockage within the vascular vessel for purposes of therapy assessment and/or feedback of a treatment of a blockage within the vascular vessel. The structural configuration of the endovascular therapy monitoring controller may include, but is not limited to, processor(s), computer-usable/computer readable storage medium(s), an operating system, application module(s), peripheral device controller (s), slot(s) and port(s).

For purposes of describing and claiming the present disclosure, the term "application module" broadly encompasses an application incorporated within or accessible by a controller consisting of an electronic circuit (e.g., electronic components and/or hardware) and/or an executable program (e.g., executable software stored on non-transitory computer readable medium(s) and/or firmware) for executing a specific application associated monitoring an activated dwell timing of an endovascular therapy devices within a vascular vessel with respect to a tracked positioning of the endovascular therapy device within the vascular vessel for purposes of therapy assessment and/or feedback of a treatment of a blockage within the vascular vessel.

For purposes of describing and claiming the present disclosure, the term "activated dwell timing" broadly encompasses one or more time periods corresponding to an activation of an endovascular therapy device 21 within a vascular vessel, and the term "tracked positioning" broadly encompasses a determination of one or more spatial positions of an endovascular therapy device 21 within a vascular vessel.

Still referring to FIG. 1, endovascular therapy monitoring controller 10 executes a synchronizing process 11 to synchronize an activated dwell timing of the endovascular therapy device 21 within a vascular vessel to a tracked positioning of the endovascular therapy device 21 contiguous with a blockage within the vascular vessel, and a monitor process 12 to monitor the treatment of the blockage within the vascular vessel induced by the endovascular therapy device 21 during a synchronization by the endovascular therapy monitoring controller 10 of the activated dwell timing of the endovascular therapy device 21 within the vascular vessel to the tracked positioning of the endovascular therapy device 21 contiguous with the blockage within the vascular vessel.

In practice, synchronizing process 11 involves endovascular therapy monitoring controller 10 inputting activation data 23 from activation controller 22 and tracking data 33 from tracking controller 32.

Activation data 23 is informative of the activated dwell timing of the endovascular therapy device 21 within the vascular vessel. In one exemplary embodiment, activation data 23 includes a one-digit binary code representative of an activation state or a deactivation state of an endovascular therapy device 21. In a second exemplary embodiment, activation data 23 includes a multi-digit binary code representative of various levels of an activation state of an endovascular therapy device 21 relative to a deactivation state of the endovascular therapy device 21

Tracking data 33 is informative of the tracked positioning of endovascular therapy device 21 within the vascular vessel (e.g., optical shape sensing tracking or electromagnetic tracking). In one exemplary embodiment, tracking data 33 includes data generated by tracking sensor(s) 31 whereby endovascular therapy monitoring controller 10 processes the sensor data to determine a spatial position of endovascular therapy device 21 within a registered coordinate system as known in the art of the disclosure. In a second exemplary embodiment, tracking controller 10 processes the sensor data to determine a spatial position of endovascular therapy device 21 to determine a spatial position of endovascular therapy device 21 within a registered coordinate system as known in the art of the disclosure and tracking data 33 includes the determined spatial position.

Still referring to FIG. 1, synchronizing process 11 further involves endovascular therapy monitoring controller 10 synchronizes activation data 23 to tracking date 33.

In one embodiment of synchronizing process 11, activation controller 22 further transmits clock signal(s) or time stamp(s) within activation data 23 to endovascular therapy monitoring controller 10 that is associated with an activated dwell timing of the endovascular therapy device 21 within the vascular vessel, and tracking controller 32 transmits clock signal(s) or time stamp(s) within tracking data 32 to endovascular therapy monitoring controller 10 that is associated with the tracked positioning of endovascular therapy device 21 contiguous with the blockage within the vascular vessel, whereby endovascular therapy monitoring controller 10 temporally aligns the clock signals or the time stamps to synchronize activation data 23 and tracking date 33.

In a second embodiment of synchronizing process 11, tracking controller 32 transmits clock signal(s) or time stamp(s) within tracking data 32 to endovascular therapy monitoring controller 10 the tracked positioning of endovascular therapy device 21 contiguous with the blockage within the vascular vessel, and further transmits sensing data tracking data 32 to endovascular therapy monitoring controller 10 that is informative of measurable effect(s) of activation(s) of endovascular therapy device 21 upon tracking sensor(s) 31 (e.g., a deformation, contortion or distortion in a shape or dimensions of tracking sensor(s) 31; a strain measurement or a temperature measurement of tracking sensor(s) 31, etc.). The measurable activation effect(s) in essence equates to time stamp(s) associated with an activated dwell timing of the endovascular therapy device 21 within the vascular vessel, whereby endovascular therapy monitoring controller 10 temporally aligns the clock signals or the time stamps to synchronize activation data 23 to the tracking date 33.

Still referring to FIG. 1, in practice, monitoring process 12 involves monitoring by endovascular therapy monitoring controller 10 of the treatment of the blockage within the vascular vessel induced by the endovascular therapy device during the synchronization of activation data 23 to tracking date 33.

For purposes of describing and claiming the present disclosure, the phrase "monitor(ing) the treatment of the blockage within the vascular vessel induced by the endovascular therapy device" broadly encompasses a comparison of an activated dwell time per position to an under-treated threshold representative of a minimum therapeutic dwell time of the endovascular therapy device at a given position necessary to effect sufficient treatment of the blockage within the vascular vessel (e.g., minimal removal of clot to facilitate healthy blood flow through the vascular vessel, or minimal drilling/cracking of plaque to facilitate healthy blood flow through the vascular vessel), and/or broadly encompasses a comparison of an activated dwell time per position to an over-treated threshold representative of a maximum therapeutic dwell time of the endovascular therapy device at a given position that may inflict damage to the vascular vessel.

In practice, the minimum therapeutic dwell time and the maximum therapeutic dwell time of an activated endovascular therapy device may be a function of a localized temperature measurement of the activated endovascular therapy device (e.g., a localized temperature measurement of an activated endovascular laser catheter via an optical shape sensor). More particularly, the minimum therapeutic dwell time and the maximum therapeutic dwell time of the activated endovascular therapy device may be decreased for temperature measurements of the activated endovascular therapy device exceeding a standard temperature threshold associated within the treatment. Conversely, the minimum therapeutic dwell time and the maximum therapeutic dwell time of the activated endovascular therapy device may be increased for temperature measurements of the activated endovascular therapy device less than the standard temperature threshold associated within the treatment.

Also in practice, an activated dwell time per position is derived from the synchronization of the activation data 23 to the tracking date 33.

For example, if the endovascular therapy device 21 is intermittently navigated through the vascular vessel and the endovascular therapy device 21 is discretely activated at each static position of endovascular therapy device 21 contiguous with the blockage within the vascular vessel, then the activated dwell time per position is directly ascertainable from the synchronization of the activation data 23 to the tracking date 33.

By further example, if the endovascular therapy device 21 is continually navigated through the vascular vessel and the endovascular therapy device 21 is continuously activated within the vascular vessel, then the activated dwell time per position may be calculated as an average derived from total activated dwelling time divided by total distance navigated by endovascular therapy device 21 during the continuously activation of endovascular therapy device 21 within the vascular vessel.

Also in practice, an operating specification of the endovascular therapy device may delineate the under-treated threshold and/or the over-treated threshold that are used by endovascular therapy monitoring controller 10, or a physician may delineate the under-treated threshold and/or the over-treated threshold to be used by endovascular therapy monitoring controller 10.

Still referring to FIG. 1, in practice, endovascular therapy monitoring controller 10 may provide a real-time assessment 63 of the treatment of the blockage within the vascular vessel in the form of a visualization with respect to the anatomy, with respect to a pre-planned map, with respect in 3D space and/or as an auto-generated text report.

Further in practice, endovascular therapy monitoring controller 10 may also provide feedback 64 to navigation controller 62 to thereby guide physicians in where to initially deploy an endovascular therapy device 21 and where to repeat deployment of therapy. For the repeat scenario, this may also include an indicator to let the physician know they have successfully gone to the right position.

Additionally in practice, endovascular therapy monitoring controller 10 may also provide robot commands 73 or feedback 74 to robot controller 72 to serve as input to robotically control a movement of an endovascular therapy device 21 and/or other device (e.g., an optical shape sensed guidewire).

In one exemplary embodiment, endovascular therapy monitoring controller 10 generates a dwell time map 80a as shown in FIG. 2A for a therapy assessment of an initial therapy having defined areas including optimally-treated areas 81a, under-treated area 82a and over-treated areas 83a, and dwell time map 80b as shown in FIG. 2B for a therapy assessment of a repeat therapy having defined areas including optimally-treated areas 81b, under-treated areas 82b and over-treated areas 83b.

Under-treated areas 82a and 82b identify gaps is anatomy where dwell time was insufficient whereby endovascular therapy monitoring controller 10 provides dwell time map to the physician as a guide for which anatomical areas need to be re-treated. More particularly, the positions of under-treat areas 82a requiring re-treatment should be saved and when the physician navigates endovascular therapy device 21 back to that position, a feedback indicator may be activated to let the physician know that endovascular therapy device 21 has been navigated to the right position. Thereafter, an additional indication may be given to the physician when an under-treated areas 82a is optimally treated based on the prior attempt and the repeat attempt. Additionally, endovascular therapy monitoring controller 10 may provide feedback to robot controller 73 in a form of a control signal representing a position that the endovascular therapy device 21 should be taken back to.

Over-treated areas 82a and 82b identify areas whereby the dwell time for a given position as exceeds a maximum threshold that indicates a position may have been over-treated. Over-treated areas 82a and 82b, endovascular therapy monitoring controller 10 automatically stops the activation of endovascular therapy device 21 or provides a feedback signal to activation controller 22 to stop the activation of endovascular therapy device 21 and to disable endovascular therapy device 21 from being reactivated until endovascular therapy device 21 has been navigated to a new position in need of treatment or has been under-treated. Concurrently or alternatively, a warning signal could be given to the physician via navigation controller 62 to stop activation of endovascular therapy device 21.

In a second exemplary embodiment, endovascular therapy monitoring controller 10 generates a dwell time map 90 as shown in FIG. 2b for a therapy assessment of a therapy system exclusively illustrating over-treated areas 91.

In practice, endovascular therapy monitoring controller 10 may generate dwell maps (e.g., dwell maps 80a, 80b and 90) in real-time as an endovascular therapy device 21 is navigated within the vascular vessel or after an entire navigation sequence as a post-assessment map for the physician. In the case of a balloon based endovascular therapy device 21, the dwell time may also have an associated pressure of inflation attached to it (e.g. via shape sensing, via pressure inflator, via entry by the staff). Additionally, endovascular therapy monitoring controller 10 may translate a dwell map to a velocity map.

To facilitate a further understanding of the present disclosure, the following description of FIGS. 3-6 teaches exemplary embodiments of an endovascular therapy procedure accordance with the present disclosure. From the description of FIGS. 3-6, those having ordinary skill in the art of the present disclosure will appreciate how to apply the present disclosure to make and use additional embodiments of an endovascular therapy procedures in accordance with the present disclosure.

Figure 3:
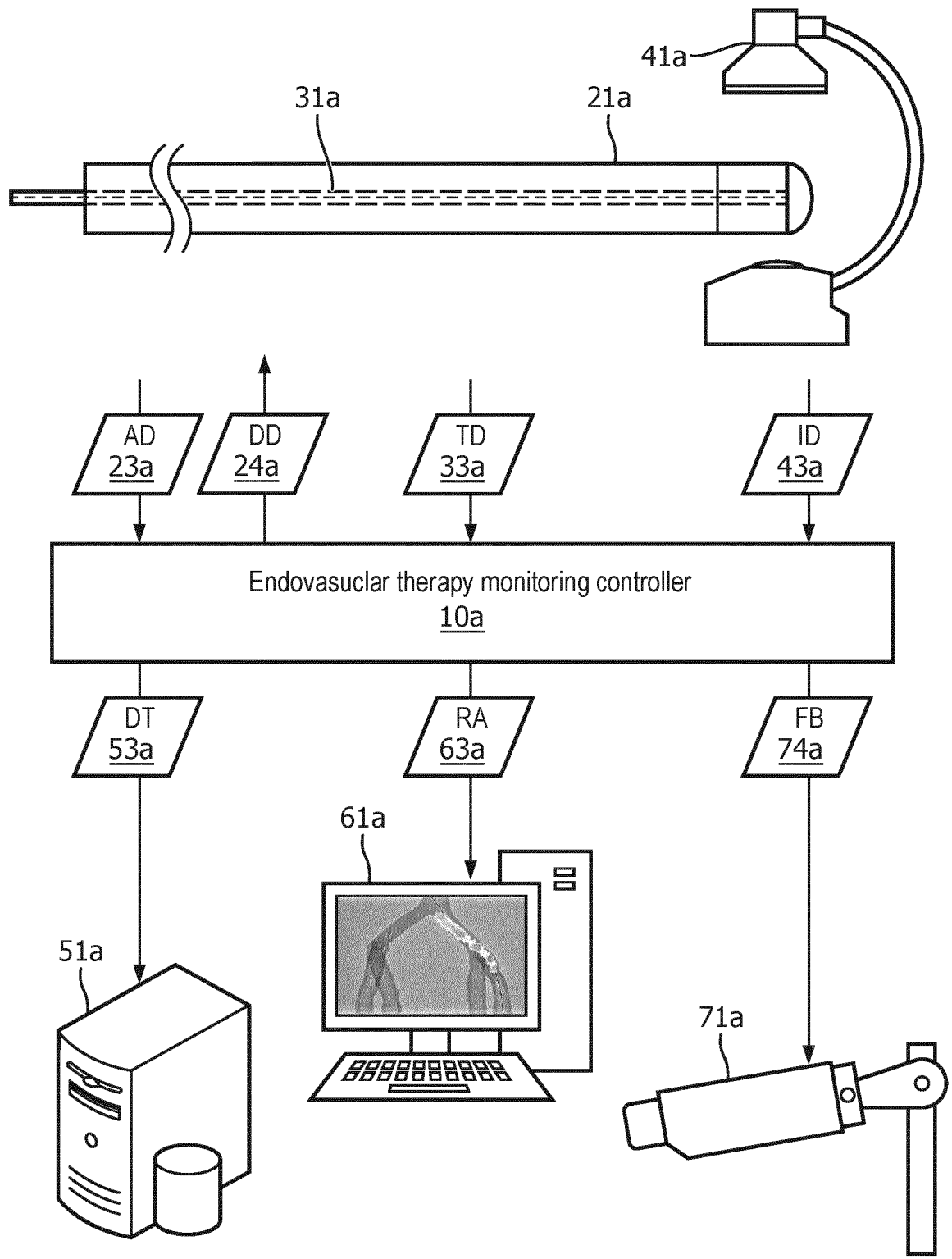
FIG. 3 illustrates an exemplary embodiment of a laser based endovascular therapy system in accordance with the present disclosure.
Figure 4:
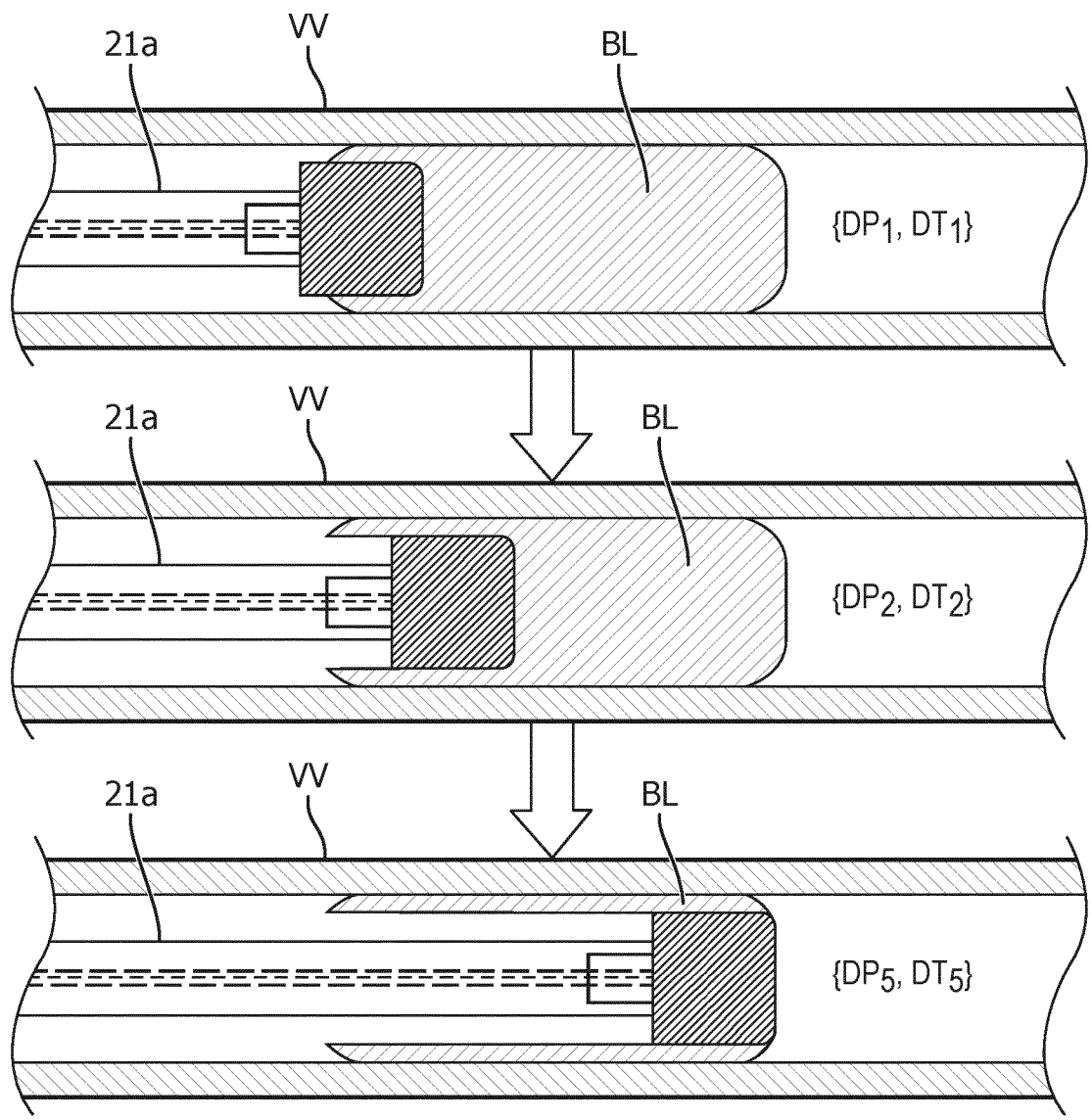
FIG. 4 illustrates an exemplary interventional a laser based endovascular therapy procedure in accordance with the present disclosure.

Referring to FIGS. 3 and 4, a laser atherectomy of the present disclosure for treating a plaque blockage BL within a vascular vessel VV is performed via a laser atherectomy catheter 21a as known in the art of the present disclosure, which is monitored via an endovascular therapy monitoring controller 10a of the present disclosure. The laser atherectomy as planned via a workstation 61a involves a tracked positioning of laser atherectomy catheter 21a contiguous with plaque blockage BL at an five (5) positions, and a planned dwell time at each position that is greater than a minimum therapeutic dwell time and less than a maximum therapeutic dwell time to facilitate achievement of an optimally treated blockage.

More particularly, the planning of the laser atherectomy as known in the art of the present disclosure is pre-operatively accomplished via workstation 61a based on an X-ray imaging by a X-ray imager 21a of the blockage BL of vascular vessel VV. A positioning of laser atherectomy catheter 21a contiguous with plaque blockage BL at any given position is accomplished via a catheter robot 71a as known in the art of the present disclosure and/or manually by a physician with visual guidance or haptic guidance as known in the art of the present disclosure. The tracked positioning of laser atherectomy catheter 21a contiguous with plaque blockage BL at an X number of positions is accomplished via an optical shape sensing guidewire 31a as known in the art of the present disclosure.

The tracked position of laser atherectomy catheter 21a may be a single point along laser atherectomy catheter 21a, a single point at a distal tip of laser atherectomy catheter 21a, or multiple points along a particular section(s) of laser atherectomy catheter 21a.

In one exemplary tracked positioning embodiment, a Unicath hub (not shown) may be attached to the proximal end of laser atherectomy catheter 21a as known in the art of the present disclosure, whereby knowing a length from the Unicath hub to the point(s) of laser atherectomy catheter 21a, which can be determined via a registration step, enables continuous tracking of the position of laser atherectomy catheter 21a along optical shape sensing guidewire 31a.

In a second exemplary tracked positioning embodiment, an activation of laser atherectomy catheter 21a along optical shape sensing guidewire 31a induces a change in a strain or a temperature of optical shape sensing guidewire 31a as known in the art of the present disclosure, which facilitates a determination of the position of the distal tip of laser atherectomy catheter 21a.

Optical shape sensing guidewire 31a is registered to the X-ray image(s) as known in the art of the present disclosure, whereby a coordinate system of optical shape sensing guidewire 31a aligns with a coordinate system of X-ray imager 21a. Thus, knowing the position of laser atherectomy catheter 21a along optical shape sensing guidewire 31a via a Unicath hub or strain inducement defines the registration of laser atherectomy catheter 21a to the X-ray image(s).

In one exemplary synchronization embodiment, endovascular therapy monitoring controller 10a receives a clock signal or time stamps via activation data 23a and tracking data 33a, whereby endovascular therapy monitoring controller 10a aligns the clock signals or time stamps.

In a second exemplary synchronization embodiment, endovascular therapy monitoring controller 10a receives a clock signal or time stamps via tracking data 33a, and measures the strain induced feature of optical shape sensing guidewire 31a when laser atherectomy catheter 21a is activated. For example, when the strain or the temperature of the optical shape sensing guidewire 31a rises above a certain threshold, the timestamps from that tracking frame and all frames above the threshold may be saved to calculate the activated dwell time of when laser atherectomy catheter 21a.

In operation, the plan encompasses laser atherectomy catheter 21a being intermittently navigated within vascular vessel VV, via catheter robot 71a as known in the art of the present disclosure and/or manually by a physician with visual guidance or haptic guidance as known in the art of the present disclosure, to each position DP contiguous with blockage BL whereby a laser treatment LT of blockage BL is monitored by endovascular therapy monitoring controller 10a.

For example as shown in FIG. 4, the plan encompasses a first laser treatment $LT_1$ involving laser atherectomy catheter 21a being initially navigated within vascular vessel VV to a tracked position $DP_1$, and laser atherectomy catheter 21a being synchronously activated for a dwell time $DT_1$. Thereafter, the plan encompasses a second laser treatment $LT_2$ involving laser atherectomy catheter 21a being further navigated within vascular vessel VV to a tracked position $DP_2$, and laser atherectomy catheter 21a being synchronously activated for a dwell time $DT_2$. Additional laser treatments are executed until the last laser treatment $LT_5$ is accomplished.

During the laser treatments, endovascular therapy monitoring controller 10a manages a database table 13a including a record for each laser treatment LT. Each record includes an indexing of the laser treatment LT, the corresponding tracked dwell position DP of laser atherectomy catheter 21a, the corresponding activation dwell time DT of laser atherectomy catheter 21a, and a treatment assessment TA of whether that particular laser treatment LT was an optimal treatment, an under-treatment or an over-treatment. Each record may further include a temperature being measured/monitored by OSS guidewire 31a.

Endovascular therapy monitoring controller 10a utilizes database table 13a to generate and communicate a dwell map to workstation 61 via assessment data 63b that highlights optimally-treated areas, an under-treated areas or an over-treated areas as previously described in the present disclosure.

For any under-treated area, endovascular therapy monitoring controller 10a may provide feedback 74a to the robot controller of catheter robot 74a to return to the tracked dwell position DP of laser atherectomy catheter 21a corresponding to the under-treated area, and/or provide feedback to the navigation controller of therapy workstation 61a to assist a physician in performing manual navigation of returning laser atherectomy catheter 21a to the tracked dwell position DP of corresponding to the under-treated area.

For any over-treated area, endovascular therapy monitoring controller 10a may send a deactivation signal 24a to the activation controller when the dwell time equals the maximum therapeutic dwell time. Additionally, endovascular therapy monitoring controller 10a may provide feedback 74a to the robot controller of catheter robot 71a to precede to the next tracked dwell position DP of laser atherectomy catheter 21a, if any, and/or may provide feedback to the navigation controller of therapy workstation 61a to assist a physician in performing manual navigation of laser atherectomy catheter 21a to the next tracked dwell position DP, if any.

Upon completion of the laser atherectomy, endovascular therapy monitoring controller 10a transmits the database table 53b to a EMR server 51a.

Figure 5:
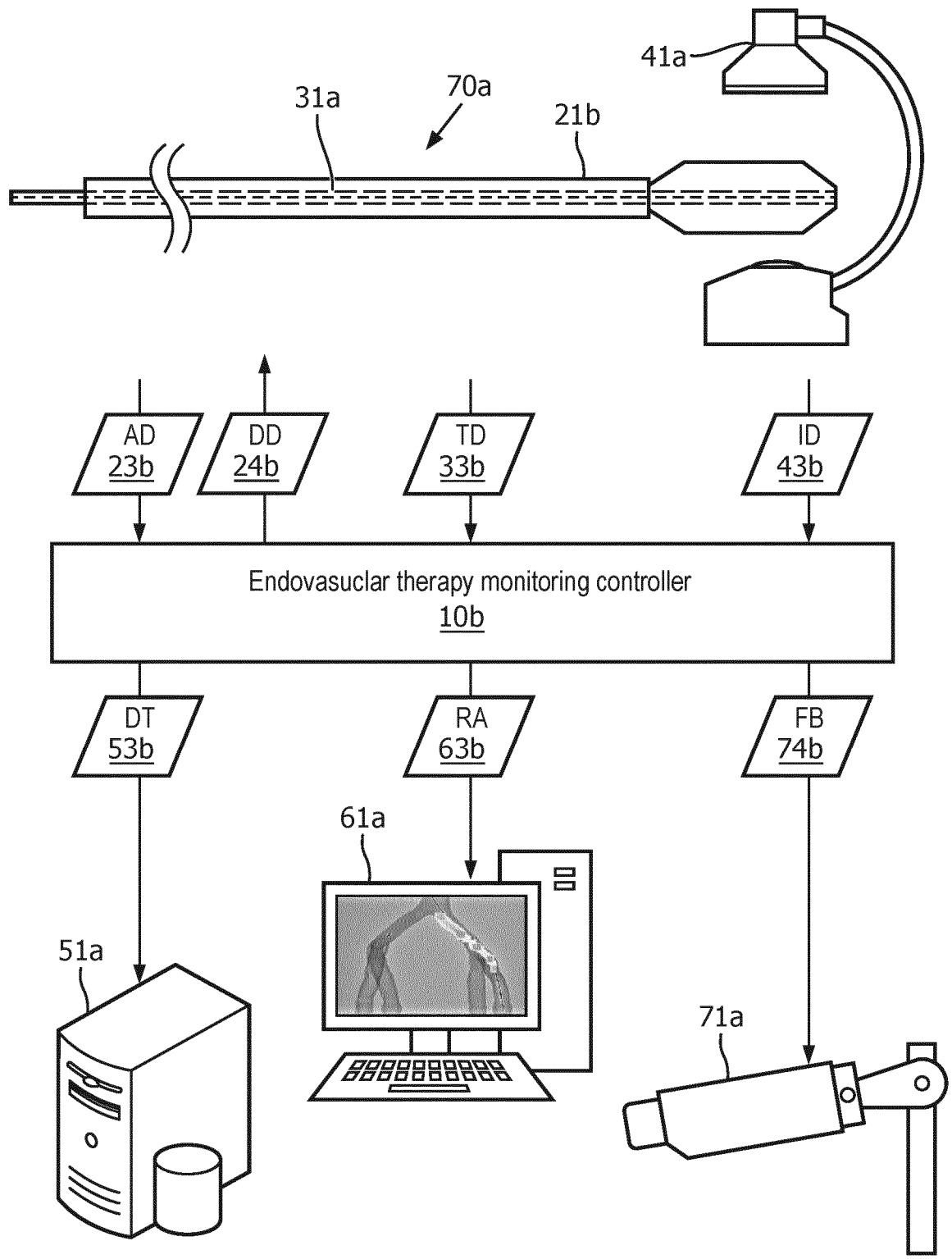
FIG. 5 illustrates an exemplary embodiment of a balloon based endovascular therapy system in accordance with the present disclosure.
Figure 6:
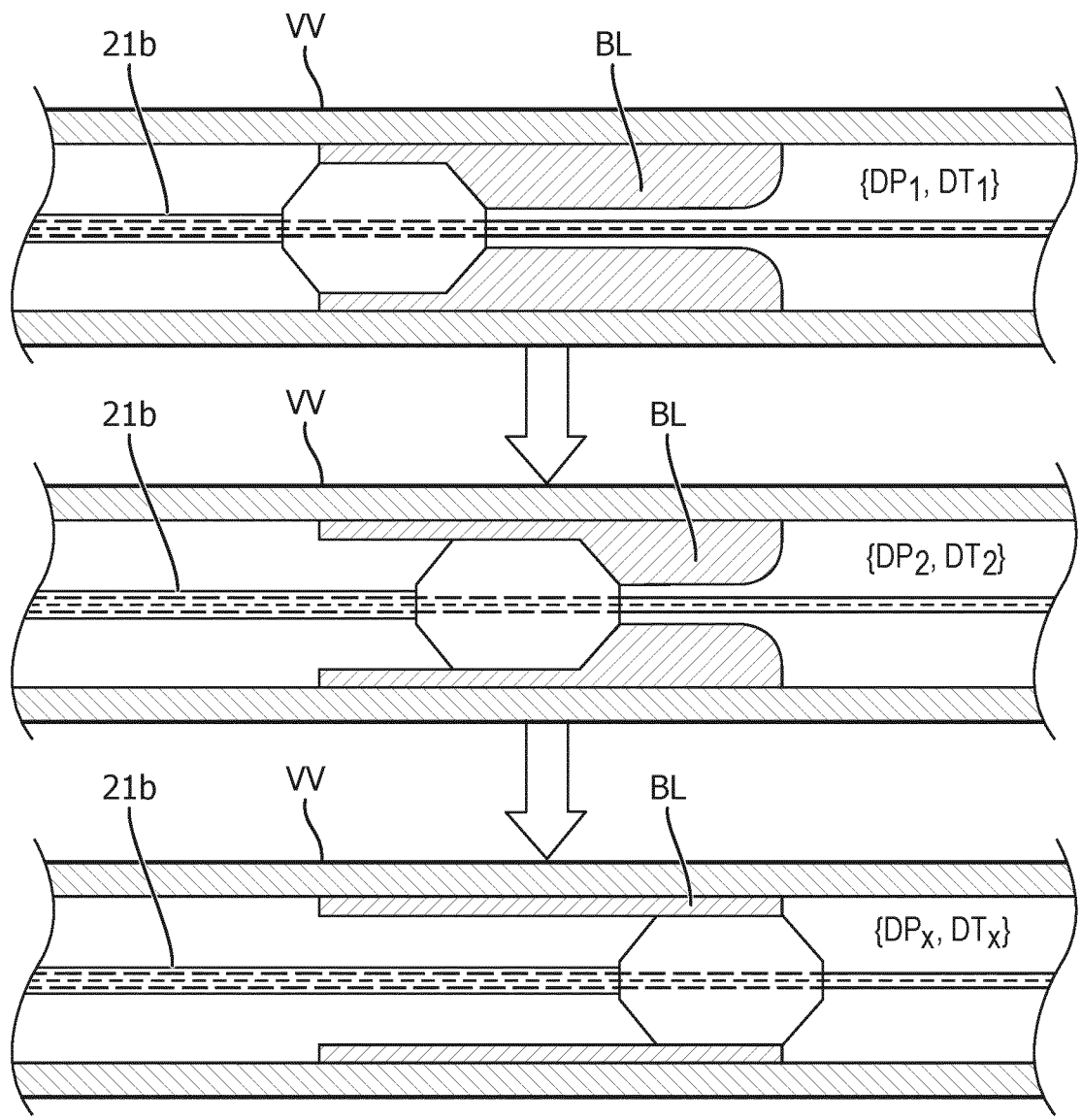
FIG. 6 illustrates an exemplary interventional a balloon based endovascular therapy procedure in accordance with the present disclosure.
Figure 6:
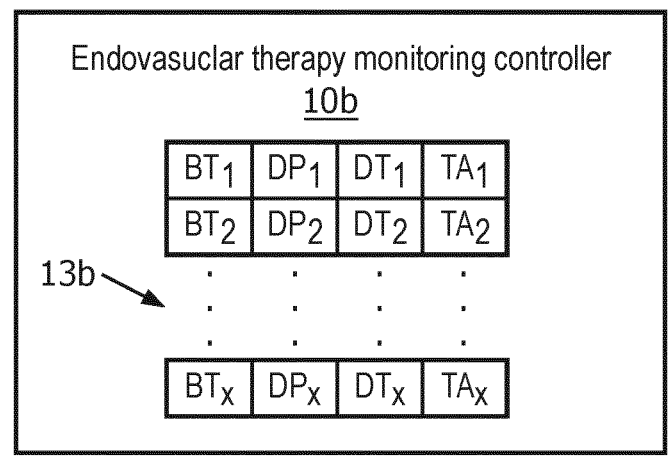

Referring to FIGS. 5 and 6, a balloon angioplasty of the present disclosure for treating a plaque blockage BL within a vascular vessel VV is performed via a balloon angioplasty catheter 21b as known in the art of the present disclosure, which is monitored via an endovascular therapy monitoring controller 10b of the present disclosure. The balloon angioplasty as planned via a workstation 61a involves a tracked positioning of balloon angioplasty catheter 21b contiguous with plaque blockage BL at an five (5) positions, and a planned dwell time at each position that is greater than a minimum therapeutic dwell time and less than a maximum therapeutic dwell time to facilitate achievement of an optimally treated blockage.

More particularly, the planning of the balloon angioplasty as known in the art of the present disclosure is pre-operatively accomplished via workstation 61a based on an X-ray imaging by a X-ray imager 21b of the blockage BL of vascular vessel VV. A positioning of balloon angioplasty catheter 21b contiguous with plaque blockage BL at any given position is accomplished via a catheter robot 71a as known in the art of the present disclosure. The tracked positioning of balloon angioplasty catheter 21b contiguous with plaque blockage BL at an X number of positions is accomplished via an optical shape sensing guidewire 31a as known in the art of the present disclosure.

The tracked position of balloon angioplasty catheter 21b may be a single point along balloon angioplasty catheter 21b, a single point at a distal tip of balloon angioplasty catheter 21b, or multiple points along a particular section(s) of balloon angioplasty catheter 21b.

In one exemplary tracked positioning embodiment, a Unicath hub (not shown) may be attached to the proximal end of balloon angioplasty catheter 21b as known in the art of the present disclosure, whereby knowing a length from the Unicath hub to the point(s) of balloon angioplasty catheter 21b, which can be determined via a registration step, enables continuous tracking of the position of balloon angioplasty catheter 21b along optical shape sensing guidewire 31a.

In a second exemplary racked positioning embodiment, an activation of balloon angioplasty catheter 21b along optical shape sensing guidewire 31a includes a change in the curvature shape of balloon angioplasty catheter 21b as known in the art of the present disclosure, which facilitates a determination of the position of the balloon angioplasty catheter 21b along optical shape sensing guidewire 31a. Further, an amount of curvature shape change is also reflective of the inflation pressure of the balloon angioplasty catheter 21b Optical shape sensing guidewire 31a is registered to the X-ray image(s) as known in the art of the present disclosure, whereby a coordinate system of optical shape sensing guidewire 31a aligns with a coordinate system of X-ray imager 21b is activated. Thus, knowing the position of balloon angioplasty catheter 21b along optical shape sensing guidewire 31a via a Unicath hub or curvature inducement defines the registration of balloon angioplasty catheter 21b to the X-ray image(s).

In one exemplary synchronization embodiment, endovascular therapy monitoring controller 10b receives a clock signal or time stamps via activation data 23b and tracking data 33b, whereby endovascular therapy monitoring controller 10b aligns align the clock signals or time stamps.

In a second exemplary synchronization embodiment, endovascular therapy monitoring controller 10b receives a clock signal or time stamps via tracking data 33b, and measures the curvature induced feature of optical shape sensing guidewire 31a when balloon angioplasty catheter 21b is activated. For example, when a curvature of optical shape sensing guidewire 31a rises above a certain threshold, the timestamps from that tracking frame and all frames above the threshold may be saved to calculate the activated dwell time of when balloon angioplasty catheter 21b.

In operation, the plan encompasses balloon angioplasty catheter 21b being intermittently navigated within vascular vessel VV via catheter robot 71a to each position DP contiguous with blockage BL whereby a balloon treatment BT of blockage BL is monitored by endovascular therapy monitoring controller 10b.

For example as shown in FIG. 6, the plan encompasses a first balloon treatment $BT_1$ involving balloon angioplasty catheter 21b being initially navigated within vascular vessel VV to a tracked position $DP_1$, and balloon angioplasty catheter 21b being synchronously activated for a dwell time $DT_1$. Thereafter, the plan encompasses a second balloon treatment $BT_2$ involving balloon angioplasty catheter 21b being further navigated within vascular vessel VV to a tracked position $DP_2$, and balloon angioplasty catheter 21b being synchronously activated for a dwell time $DT_2$. Additional laser treatments are executed until the last balloon treatment $BT_5$ is accomplished.

During the laser treatments, endovascular therapy monitoring controller 10b manages a database table 13b including a record for each balloon treatment BT. Each record includes an indexing of the balloon treatment BT, the corresponding tracked dwell position DP of balloon angioplasty catheter 21b, the corresponding activation dwell time DT of balloon angioplasty catheter 21b, and a treatment assessment TA of whether that particular balloon treatment BT was an optimal treatment, an under-treatment or an over-treatment.

Endovascular therapy monitoring controller 10b utilizes database table 13b to generate and communicate a dwell map to workstation 61 via assessment data 63a that highlights optimally-treated areas, an under-treated areas or an over-treated areas as previously described in the present disclosure.

For any under-treated area, endovascular therapy monitoring controller 10b may provide feedback 74b to the robot controller of catheter robot 74b to return to the tracked dwell position DP of balloon angioplasty catheter 21b corresponding to the under-treated area and/or provide feedback to the navigation controller of therapy workstation 61a to assist a physician in performing manual navigation of returning balloon angioplasty catheter 21b to the tracked dwell position DP of corresponding to the under-treated area.

For any over-treated area, endovascular therapy monitoring controller 10b may send a deactivation signal 24b to the activation controller when the dwell time equals the maximum therapeutic dwell time. Additionally, endovascular therapy monitoring controller 10b may provide feedback 74b to the robot controller of catheter robot 71a to precede to the next tracked dwell position DP of balloon angioplasty catheter 21b, if any, and/or may provide feedback to the navigation controller of therapy workstation 61a to assist a physician in performing manual navigation of balloon angioplasty catheter 21b to the next tracked dwell position DP, if any.

Upon completion of the laser atherectomy, endovascular therapy monitoring controller 10b transmits the database table 53b to EMR server 51a.

Figure 7:
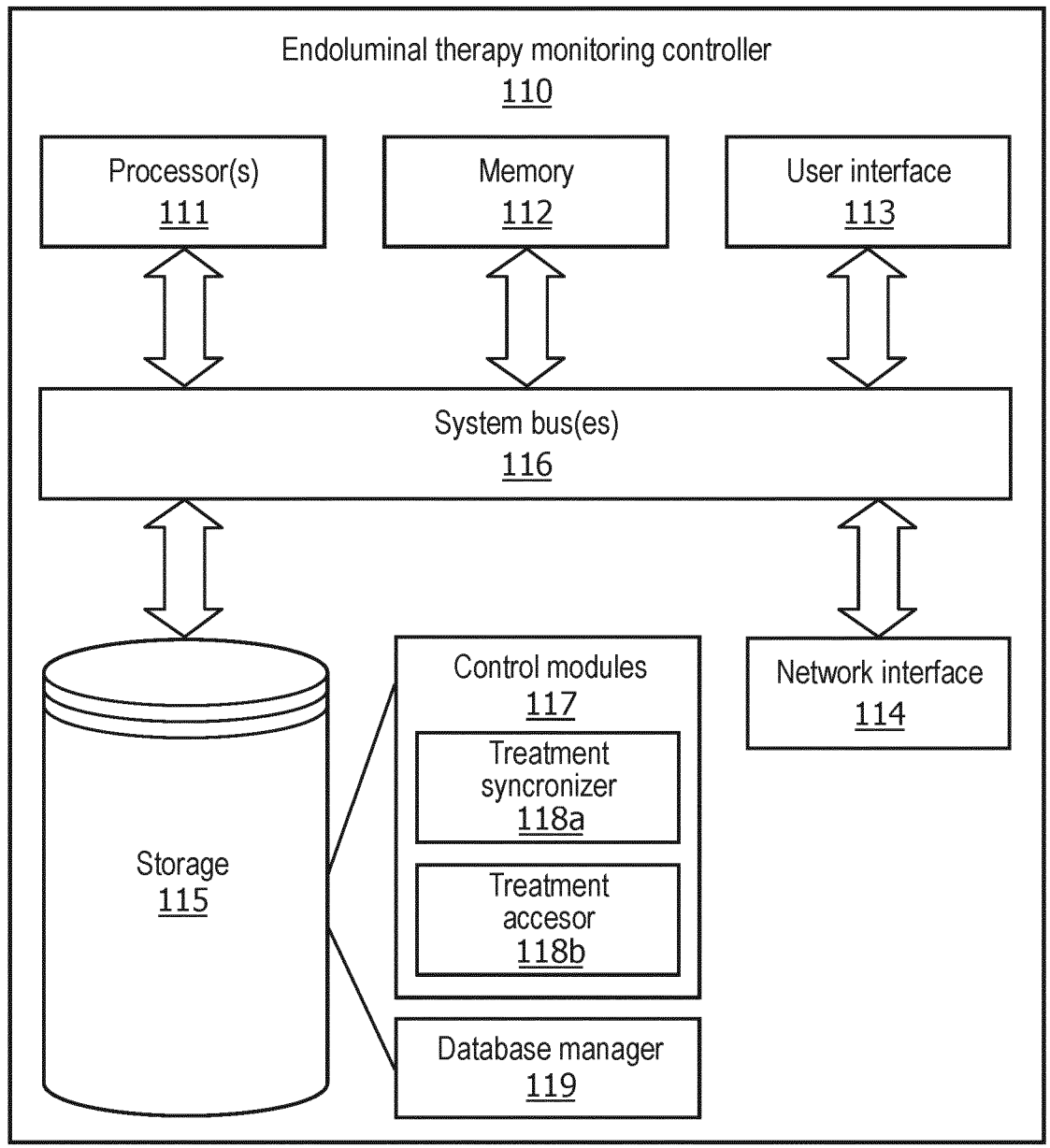
FIG. 7 illustrates an exemplary embodiment of an endovascular therapy monitoring controller in accordance with the present disclosure.
Figure 8:
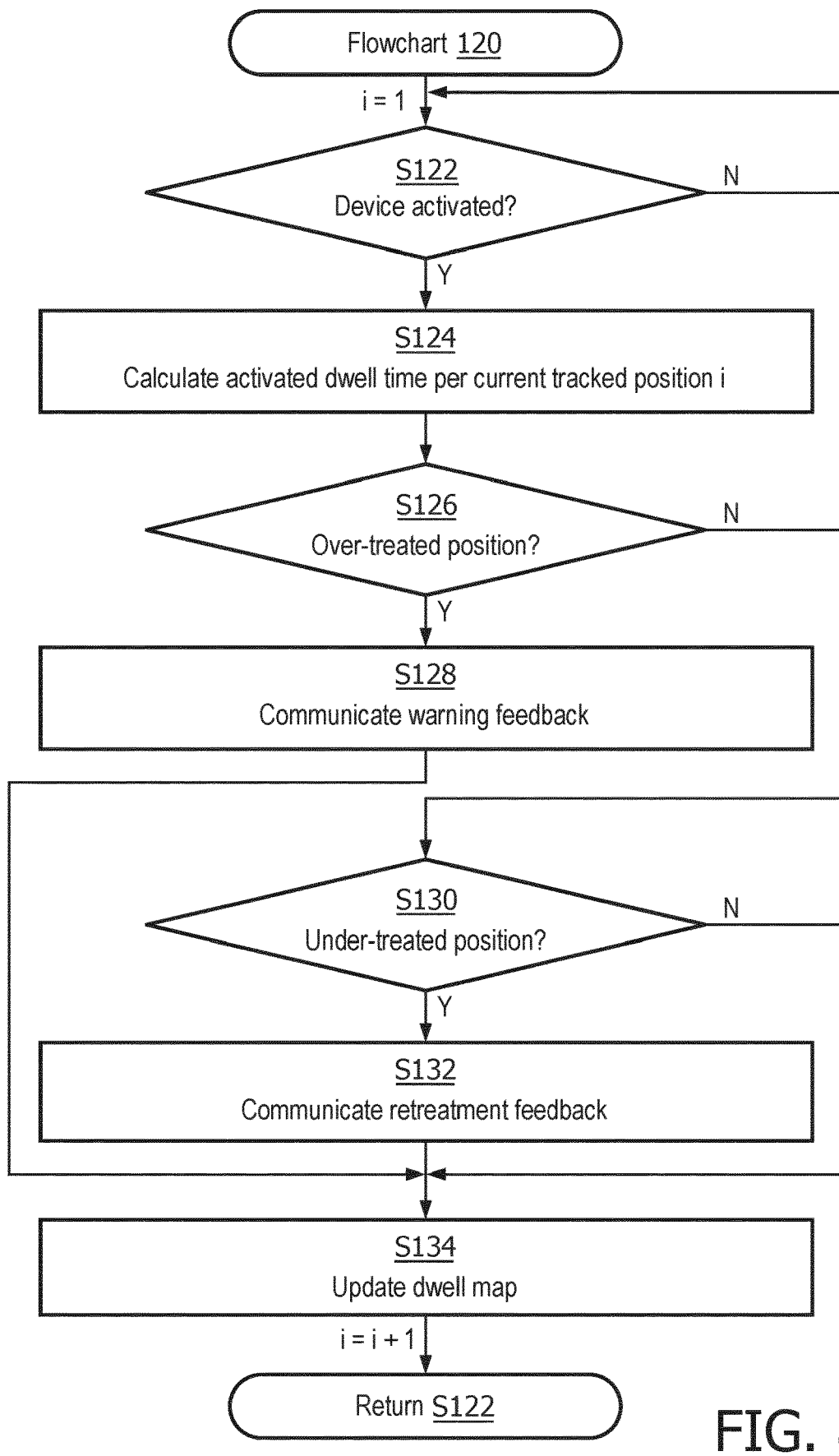
FIG. 8 illustrates an exemplary embodiment of a flowchart representative of an endoscopy therapy monitoring method in accordance with the present disclosure.

To facilitate a further understanding of the present disclosure, the following description of FIGS. 7 and 8 respectively teach an exemplary embodiment of an endovascular therapy monitoring controller of the present disclosure and an exemplary embodiment of an endovascular therapy monitoring method of the present disclosure. From this description, those having ordinary skill in the art will appreciate how to apply various aspects of the present disclosure for making and using additional embodiments of an endovascular therapy monitoring controller of the present disclosure and an endovascular therapy monitoring method of the present disclosure.

Referring to FIG. 7, an endovascular therapy monitoring controller 110 includes one or more processor(s) 111, memory 112, a user interface 113, a network interface 114, and a storage 115 interconnected via one or more system buses 116.

Each processor 111 may be any hardware device, as known in the art of the present disclosure or hereinafter conceived, capable of executing instructions stored in memory 112 or storage or otherwise processing data. In a non-limiting example, the processor(s) 111 may include a microprocessor, field programmable gate array (FPGA), application-specific integrated circuit (ASIC), or other similar devices.

The memory 112 may include various memories, as known in the art of the present disclosure or hereinafter conceived, including, but not limited to, L1, L2, or L3 cache or system memory. In a non-limiting example, the memory 112 may include static random access memory (SRAM), dynamic RAM (DRAM), flash memory, read only memory (ROM), or other similar memory devices.

The user interface 113 may include one or more devices, as known in the art of the present disclosure or hereinafter conceived, for enabling communication with a user such as an administrator. In a non-limiting example, the user interface may include a command line interface or graphical user interface that may be presented to a remote terminal via the network interface 114.

The network interface 114 may include one or more devices, as known in the art of the present disclosure or hereinafter conceived, for enabling communication with other hardware devices. In a non-limiting example, the network interface 114 may include a network interface card (NIC) configured to communicate according to the Ethernet protocol. Additionally, the network interface 114 may implement a TCP/IP stack for communication according to the TCP/IP protocols. Various alternative or additional hardware or configurations for the network interface 114 will be apparent.

The storage 115 may include one or more machine-readable storage media, as known in the art of the present disclosure or hereinafter conceived, including, but not limited to, read-only memory (ROM), random-access memory (RAM), magnetic disk storage media, optical storage media, flash-memory devices, or similar storage media. In various non-limiting embodiments, the storage 115 may store instructions for execution by the processor(s) 111 or data upon with the processor(s) 111 may operate. For example, the storage 115 may store a base operating system for controlling various basic operations of the hardware. The storage 115 also stores application modules 117 in the form of executable software/firmware for implementing the various functions of the endovascular therapy monitoring controller 110 as previously described in the present disclosure including, but not limited to, a treatment synchronizer 118a and a treatment accessor 118b for executing a flowchart 120 representative of an endovascular therapy monitoring method of the present disclosure as shown in FIG. 8.

Referring to FIG. 8, a stage S122 of flowchart 120 encompasses treatment synchronizer 118a ascertaining if an endovascular therapy device has been activated at a current tracked position i synchronized with an activation via clock signals, time stamps and/or induced features of an optical shape sensing device.

If treatment synchronizer 118a ascertains endovascular therapy device has been activated at stage S122, then treatment synchronizer 118a proceeds to a stage S124 of flowchart 120 to calculate an activated dwell time for the current tracked position i.

From the calculation of stage S124, a stage S126 of flowchart encompasses treatment accessor 118b ascertaining if the endovascular therapy device overtreated the blockage within the vascular vessel at the current tracked position i.

If treatment accessor 118b ascertains the endovascular therapy device did overtreat the blockage within the vascular vessel at the current tracked position i during stage S126, then treatment accessor 118b proceeds to a state S128 of flowchart 120 to communicate a warning feedback to an activation controller (e.g., a deactivation trigger), a physician (e.g., a deactivation warning) and/or a robot controller (e.g., a robot command to move the endovascular therapy device to the next position i.

Thereafter, a stage S134 of flowchart 120 encompasses treatment accessor 118b to update a dwell map showing the overtreated area of the vascular vessel at the current position i, and flowchart 120 returning to stage S122 for the next position i+1. If treatment accessor 118b ascertains the endovascular therapy device did not overtreat the blockage of the vascular vessel at the current tracked position i during stage S126, then treatment accessor 118b proceeds to a stage S130 of flowchart 120 to ascertain if the endovascular therapy device undertreated the blockage within the vascular vessel at the current tracked position i.

If treatment accessor 118b ascertains the endovascular therapy device did undertreat the blockage within the vascular vessel at the current tracked position i during stage S130, then treatment accessor 118b proceeds to a state S132 of flowchart 120 to communicate a retreatment feedback to an activation controller (e.g., a reactivation trigger for a time equating the maximum therapeutic dwell time less then calculated dwell time), and a physician (e.g., a reactivation text for a time equating the maximum therapeutic dwell time less then calculated dwell time). The retreatment may be accomplished during stage S132 or at a later time.

Thereafter, stage S134 of flowchart 120 encompasses treatment accessor 118b updating a dwell map showing the undertreated area of the vascular vessel at the current position i if retreatment is to occur at a later time and flowchart 120 returning to stage S122 for the next position i+1.

If treatment accessor 118*b* ascertains the endovascular therapy device did not undertreat the blockage within the vascular vessel at the current tracked position i during stage S130 or an undertreat was immediately retreated to an optimal treatment, then stage S134 of flowchart 120 encompasses treatment accessor 118*b* updating the dwell map showing the optimally-treated area of the vascular vessel at the current position i and flowchart 120 returning to stage S122 for the next position i+1.

During the execution of flowchart 120, a database manager 119 maintains a database table of the monitoring of the endovascular therapy procedure.

Flowchart 120 may be terminated/interrupted at any time, particularly upon execution of the planned endovascular therapy procedure. Referring to FIGS. 1-8, those having ordinary skill in the art of the present disclosure will appreciate numerous benefits of the present disclosure including, but not limited to, obtain a real-time assessment of therapy device utilization, performance, and efficacy and enables feedback loops to the physician or system to guide the therapy device for optimal treatment.

Further, as one having ordinary skill in the art will appreciate in view of the teachings provided herein, structures, elements, components, etc. described in the present disclosure/specification and/or depicted in the Figures may be implemented in various combinations of hardware and software, and provide functions which may be combined in a single element or multiple elements. For example, the functions of the various structures, elements, components, etc. shown/illustrated/depicted in the Figures can be provided through the use of dedicated hardware as well as hardware capable of executing software in association with appropriate software for added functionality. When provided by a processor, the functions can be provided by a single dedicated processor, by a single shared processor, or by a plurality of individual processors, some of which can be shared and/or multiplexed. Moreover, explicit use of the term "processor" or "controller" should not be construed to refer exclusively to hardware capable of executing software, and can implicitly include, without limitation, digital signal processor ("DSP") hardware, memory (e.g., read only memory ("ROM") for storing software, random access memory ("RAM"), non-volatile storage, etc.) and virtually any means and/or machine (including hardware, software, firmware, combinations thereof, etc.) which is capable of (and/or configurable) to perform and/or control a process.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (e.g., any elements developed that can perform the same or substantially similar function, regardless of structure). Thus, for example, it will be appreciated by one having ordinary skill in the art in view of the teachings provided herein that any block diagrams presented herein can represent conceptual views of illustrative system components and/or circuitry embodying the principles of the invention. Similarly, one having ordinary skill in the art should appreciate in view of the teachings provided herein that any flow charts, flow diagrams and the like can represent various processes which can be substantially represented in computer readable storage media and so executed by a computer, processor or other device with processing capabilities, whether or not such computer or processor is explicitly shown.

The terms "signal", "data" and "command" as used in the present disclosure broadly encompasses all forms of a detectable physical quantity or impulse (e.g., voltage, current, or magnetic field strength) as understood in the art of the present disclosure and as exemplary described in the present disclosure for transmitting information and/or instructions in support of applying various inventive principles of the present disclosure as subsequently described in the present disclosure. Signal/data/command communication between various components of the present disclosure may involve any communication method as known in the art of the present disclosure including, but not limited to, signal/data/command transmission/reception over any type of wired or wireless datalink and a reading of signal/data/commands uploaded to a computer-usable/computer readable storage medium.

Having described preferred and exemplary embodiments of the various and numerous inventions of the present disclosure (which embodiments are intended to be illustrative and not limiting), it is noted that modifications and variations can be made by persons skilled in the art in light of the teachings provided herein, including the Figures. It is therefore to be understood that changes can be made in/to the preferred and exemplary embodiments of the present disclosure which are within the scope of the embodiments disclosed herein.

Moreover, it is contemplated that corresponding and/or related systems incorporating and/or implementing the device/system or such as may be used/implemented in/with a device in accordance with the present disclosure are also contemplated and considered to be within the scope of the present disclosure. Further, corresponding and/or related method for manufacturing and/or using a device and/or system in accordance with the present disclosure are also contemplated and considered to be within the scope of the present disclosure.

The invention claimed is:

1. An endovascular therapy monitoring method for an endovascular therapy monitoring controller to monitor a treatment of a site to be treated within a vessel induced by an endovascular therapy device, the endovascular therapy monitoring method comprising:

synchronizing an activated dwell timing of the endovascular therapy device within the vessel to a data relating to tracked positioning of the endovascular therapy device contiguous with the site to be treated within the vessel, the activated dwell timing referring to one or more time periods corresponding to activation of the endovascular therapy device within the vessel, wherein synchronizing, by the endovascular therapy monitoring controller, further comprises temporally aligning one of a clock signal or a time stamp associated with the activated dwell timing of the endovascular therapy device within the vessel to one of a clock signal or a time stamp associated with the tracked positioning of the endovascular therapy device contiguous with the site to be treated within the vessel; and monitoring the treatment of the site to be treated within the vessel induced by the endovascular therapy device during the synchronization by the endovascular therapy monitoring controller of the activated dwell timing of the endovascular therapy device within the vessel to the tracked positioning of the endovascular therapy device contiguous with the site to be treated within the vessel, wherein the monitoring comprises generating a dwell time map for assessing the treatment.

2. The endovascular therapy monitoring method of claim 1, wherein the monitoring, by the endovascular therapy monitoring controller, of the treatment of the site to be treated within the vessel induced by the endovascular therapy device during the synchronization by the endovascular therapy monitoring controller of the activated dwell timing of the endovascular therapy device within the vessel to the tracked positioning of the endovascular therapy device contiguous with the site to be treated within the vessel includes:

- calculating, by the endovascular therapy monitoring controller, an activated dwell time of the endovascular therapy device within the vessel at a tracked position of the endovascular therapy device contiguous with the site to be treated within the vessel; and
- assessing, by the endovascular therapy monitoring controller, a treatment of an area of the vessel corresponding to the tracked position of the endovascular therapy device contiguous with the site to be treated within the vessel based on the activated dwell time of the endovascular therapy device within the vessel.

3. The endovascular therapy monitoring method of claim 2, wherein the assessing, by the endovascular therapy monitoring controller, of the treatment of the area of the vessel corresponding to the tracked position of the endovascular therapy device contiguous with the site to be treated within the vessel based on the activated dwell time of the endovascular therapy device within the vessel comprises:

- defining, by the endovascular therapy monitoring controller, the treatment of the area of the vessel corresponding to the tracked position of the endovascular therapy device contiguous with the site to be treated within the vessel as an optimally-treated area responsive to the activated dwell time of the endovascular therapy device within the vessel being at least one of greater than an under-treated threshold representative of a minimum therapeutic dwell time and less than an over-treated threshold representative of a maximum therapeutic dwell time.

4. The endovascular therapy monitoring method of claim 2, wherein the assessing, by the endovascular therapy monitoring controller, of the treatment of the area of the vessel corresponding to the tracked position of the endovascular therapy device contiguous with the site to be treated within the vessel based on the activated dwell time of the endovascular therapy device within the vessel comprises at least one of:

- defining, by the endovascular therapy monitoring controller, the treatment of the area of the vessel corresponding to the tracked position of the endovascular therapy device contiguous with the site to be treated within the vessel as an under-treated area responsive to the activated dwell time of the endovascular therapy device within the vessel being less than an under-treated threshold representative of a minimum therapeutic dwell time; and
- defining, by the endovascular therapy monitoring controller, the treatment of the area of the vessel corresponding to the tracked position of the endovascular therapy device contiguous with the site to be treated within the vessel as an over-treated area responsive to the activated dwell time of the endovascular therapy device within the vessel being greater than an over-treated threshold representative of a maximum therapeutic dwell time.

5. An endovascular therapy system comprising an endovascular therapy monitoring controller for monitoring a treatment of a blockage at a site to be treated within a vessel induced by an endovascular therapy device, the endovascular therapy monitoring controller comprising:

- a non-transitory machine-readable storage medium encoded with instructions for execution by the endovascular monitoring controller, the non-transitory machine-readable storage medium including the instructions to:
- synchronize an activated dwell timing of the endovascular therapy device within the vessel to a data relating to tracked positioning of the endovascular therapy device contiguous with the site to be treated within the vessel, the activated dwell timing referring to one or more time periods corresponding to activation of the endovascular therapy device within the vessel, wherein when synchronizing by the endovascular therapy monitoring controller, the instructions further cause the controller to temporally align one of a clock signal or a time stamp associated with the activated dwell timing of the endovascular therapy device within the vessel to one of a clock signal or a time stamp associated with the tracked positioning of the endovascular therapy device contiguous with the site to be treated within the vessel; and
- monitor the treatment of the site to be treated within the vessel induced by the endovascular therapy device during the synchronization by the endovascular therapy monitoring controller of the activated dwell timing of the endovascular therapy device within the vessel to the tracked positioning of the endovascular therapy device B contiguous with the site to be treated within the vessel, wherein when monitoring, the instructions further cause the controller to generate a dwell time map for assessing the treatment.

6. The endovascular therapy system of claim 5, wherein the instructions to monitor the treatment of the site to be treated within the vessel induced by the endovascular therapy device during the synchronization by the endovascular therapy monitoring controller of the activated dwell timing of the endovascular therapy device within the vessel to the tracked positioning of the endovascular therapy device contiguous with the site to be treated within the vessel comprises instructions to:

- calculate an activated dwell time of the endovascular therapy device within the vessel at a tracked position of the endovascular therapy device contiguous with the site to be treated within the vessel; and
- assess a treatment of an area of the vessel corresponding to the tracked position of the endovascular therapy device contiguous with the site to be treated within the vessel based on the activated dwell time of the endovascular therapy device within the vessel.

7. The endovascular therapy system of claim 6, wherein the instructions to assess the treatment of the area of the vessel corresponding to the tracked position of the endovascular therapy device contiguous with the site to be treated within the vessel based on the activated dwell time of the endovascular therapy device within the vessel comprises instructions to:

- define the treatment of the area of the vessel corresponding to the tracked position of the endovascular therapy device contiguous with the site to be treated within the vessel as an optimally-treated area responsive to the activated dwell time of the endovascular therapy device within the vessel being at least one of greater than an under-treated threshold representative of a minimum therapeutic dwell time and less than an over-treated threshold representative of a maximum therapeutic dwell time.

8. The endovascular therapy system of claim 6, wherein the instructions to assess the treatment of the area of the vessel corresponding to the tracked position of the endovascular therapy device contiguous with the site to be treated within the vessel based on the activated dwell time of the endovascular therapy device within the vessel comprises instructions to:
define the treatment of the area of the vessel corresponding to the tracked position of the endovascular therapy device contiguous with the site to be treated within the vessel as an under-treated area responsive to the activated dwell time of the endovascular therapy device within the vessel being less than an under-treated threshold representative of a minimum therapeutic dwell time.

9. The endovascular therapy system of claim 6, wherein the instructions to assess the treatment of the area of the vessel corresponding to the tracked position of the endovascular therapy device contiguous with the site to be treated within the vessel based on the activated dwell time of the endovascular therapy device within the vessel comprises instructions to:
define the treatment of the area of the vessel corresponding to the tracked position of the endovascular therapy device contiguous with the site to be treated within the vessel as an over-treated area responsive to the activated dwell time of the endovascular therapy device within the vessel being greater than an over-treated threshold representative of a maximum therapeutic dwell time.

10. The endovascular therapy system of claim 5, further comprising:
the endovascular therapy device controllable to implement the treatment; and
wherein the endovascular therapy monitoring controller is arranged for monitoring the treatment induced by the endovascular therapy device.

11. The endovascular therapy system of claim 5, further comprising:
an optical shape sensor operable to generate sensing data indicative of the activated dwell timing of the endovascular therapy device within the vessel.

12. The endovascular therapy system of claim 5, wherein the endovascular therapy device is one of an atherectomy catheter or an angioplasty catheter.

13. The endovascular therapy system of claim 12, wherein the system is arranged to implement said treatment, this treatment being the treatment of the blockage at the site to be treated within the vessel.

14. A non-transitory computer readable medium that stores instructions, which when executed by an endovascular therapy monitoring controller is configured to:
monitor a treatment of a site to be treated within a vessel induced by an endovascular therapy device:
synchronize an activated dwell timing of the endovascular therapy device within the vessel to data relating to a tracked positioning of the endovascular therapy device contiguous with the site to be treated within the vessel, wherein when synchronizing by the endovascular therapy monitoring controller, the instructions further cause the controller to temporally align one of a clock signal or a time stamp associated with the activated dwell timing of the endovascular therapy device within the vessel to one of a clock signal or a time stamp associated with the tracked positioning of the endovascular therapy device contiguous with the site to be treated within the vessel; and
monitor the treatment of the site to be treated within the vessel induced by the endovascular therapy device during the synchronizing by the endovascular therapy monitoring controller of the activated dwell timing of the endovascular therapy device within the vessel to the tracked positioning of the endovascular therapy device B contiguous with the site to be treated within the vessel, wherein when monitoring, the instructions further cause the controller to generate a dwell time map for assessing the treatment.

15. The non-transitory computer readable medium of claim 14, wherein when the monitoring of the treatment of the site to be treated within the vessel induced by the endovascular therapy device during the synchronization of the activated dwell timing of the endovascular therapy device within the vessel to the tracked positioning of the endovascular therapy device contiguous with the site to be treated is carried out, the instructions further cause the endovascular therapy monitoring controller to:
calculate an activated dwell time of the endovascular therapy device within the vessel at a tracked position of the endovascular therapy device contiguous with the site to be treated within the vessel; and
assess the treatment of an area of the vessel corresponding to the tracked position of the endovascular therapy device contiguous with the site to be treated within the vessel based on the activated dwell time of the endovascular therapy device within the vessel.

16. The non-transitory computer readable medium of claim 15, wherein the instructions further cause the endovascular therapy monitoring controller to:
assess the treatment of the area of the vessel corresponding to the tracked position of the endovascular therapy device contiguous with the site to be treated within the vessel based on the activated dwell time of the endovascular therapy device; and
define the treatment of the area of the vessel corresponding to the tracked position of the endovascular therapy device contiguous with the site to be treated within the vessel as an optimally-treated area responsive to the activated dwell time of the endovascular therapy device within the vessel being at least one of greater than an under-treated threshold representative of a minimum therapeutic dwell time and less than an over-treated threshold representative of a maximum therapeutic dwell time.

17. The non-transitory computer readable medium of claim 15, wherein when the assessment of the treatment of the area of the vessel corresponding to the tracked position of the endovascular therapy device contiguous with the site to be treated within the vessel based on the activated dwell time of the endovascular therapy device within the vessel, the instructions further cause the endovascular therapy monitoring controller to:
define the treatment of the area of the vessel corresponding to the tracked position of the endovascular therapy device contiguous with the site to be treated within the vessel as an under-treated area responsive to the activated dwell time of the endovascular therapy device within the vessel being less than an under-treated threshold representative of a minimum therapeutic dwell time; and define the treatment of the area of the vessel corresponding to the tracked position of the endovascular therapy device contiguous with the site to be treated within the vessel as an over-treated area responsive to the activated dwell time of the endovascular therapy device within the vessel being greater than an over-treated threshold representative of a maximum therapeutic dwell time.

18. An endovascular therapy monitoring method for an endovascular therapy monitoring controller to monitor a treatment of a site to be treated within a vessel induced by an endovascular therapy device, the endovascular therapy monitoring method comprising:

synchronizing, by the endovascular therapy monitoring controller, sensing data indicative of an activated dwell timing of the endovascular therapy device within the vessel to one of a clock signal or a time stamp associated with the tracked positioning of the endovascular therapy device contiguous with the site to be treated within the lumen vessel, wherein synchronizing, by the endovascular therapy monitoring controller, further comprises temporally aligning the sensing data indicative of the activated dwell timing of the endovascular therapy device withing the vessel to one of the clock signal or the time stamp associated with the tracked positioning of the endovascular therapy device contiguous with the site to be treated within the vessel; and monitoring the treatment of the site to be treated within the vessel induced by the endovascular therapy device during the synchronization by the endovascular therapy monitoring controller of the activated dwell timing of the endovascular therapy device within the vessel to the tracked positioning of the endovascular therapy device contiguous with the site to be treated within the vessel, wherein the monitoring comprises generating a dwell time map for assessing the treatment.

19. An endovascular therapy system comprising an endovascular therapy monitoring controller for monitoring a treatment of a blockage at a site to be treated within a vessel induced by an endovascular therapy device, the endovascular therapy monitoring controller comprising:

a non-transitory machine-readable storage medium encoded with instructions for execution by the endovascular monitoring controller, the non-transitory machine-readable storage medium including the instructions to:

synchronize sensing data indicative of an activated dwell timing of the endovascular therapy device within the vessel to one of a clock signal or a time stamp associated with the tracked positioning of the endovascular therapy device contiguous with the site to be treated within the vessel, wherein when synchronizing by the endovascular therapy monitoring controller, the instructions further cause the controller to temporally align the sensing data indicative of the activated dwell timing of the endovascular therapy device within the vessel to one of the clock signal or the time stamp associated with the tracked positioning of the endovascular therapy device contiguous with the site to be treated within the vessel; and monitor the treatment of the site to be treated within the vessel induced by the endovascular therapy device during the synchronization by the endovascular therapy monitoring controller of the activated dwell timing of the endovascular therapy device within the vessel to the tracked positioning of the endovascular therapy device contiguous with the site to be treated within the vessel, wherein when monitoring, the instructions further cause the controller to generate a dwell time map for assessing the treatment.

* * * * *